United States Patent
Bovington

(10) Patent No.: US 10,365,432 B1
(45) Date of Patent: Jul. 30, 2019

(54) OPTICAL DEVICE WITH REDUCED BACK REFLECTION

(71) Applicant: Axalume, Inc., Cayenne Creek Rd., CA (US)

(72) Inventor: Jock Bovington, La Mesa, CA (US)

(73) Assignee: Axalume, Inc., San Diego, CA (US)

( * ) Notice: Subject to any disclaimer, the term of this patent is extended or adjusted under 35 U.S.C. 154(b) by 0 days.

(21) Appl. No.: 15/959,196

(22) Filed: Apr. 21, 2018

(51) Int. Cl.
*G02B 6/12* (2006.01)

(52) U.S. Cl.
CPC .. *G02B 6/12004* (2013.01); *G02B 2006/1215* (2013.01); *G02B 2006/12038* (2013.01); *G02B 2006/12061* (2013.01)

(58) Field of Classification Search
USPC .......................................................... 385/14
See application file for complete search history.

(56) References Cited

U.S. PATENT DOCUMENTS

| | | | |
|---|---|---|---|
| 2005/0135729 A1* | 6/2005 | Welch | B82Y 20/00 385/14 |
| 2018/0062753 A1* | 3/2018 | Yue | H04B 10/541 |
| 2018/0183517 A1* | 6/2018 | Sugiyama | H04B 10/07957 |
| 2018/0249555 A1* | 8/2018 | Sugiyama | H05B 37/0227 |

OTHER PUBLICATIONS

Youwen Fan, et al., "Optically Integrated InP—Si3N4 Hybrid Laser," IEEE Photonics Journal, vol. 8, No. 6, Dec. 2016.
Chris G. H. Roeloffzen, et al., "Low-Loss Si3N4 TriPLeX Optical Waveguides: Technology and Applications Overview," IEEE Journal of Selected Topics in Quantum Electronics, vol. 24, No. 4, Jul./Aug. 2018, published Jan. 15, 2018.

* cited by examiner

*Primary Examiner* — Eric Wong
(74) *Attorney, Agent, or Firm* — Steven Stupp

(57) ABSTRACT

An integrated circuit that reduces back reflection of an optical signal is described. This integrated circuit may convey an optical signal in an optical waveguide defined in a layer in the integrated circuit. The integrated circuit may split the optical signal into portions of the optical signal using an optical splitter, and may convey the portions of the optical signal in at least two arms of the optical waveguide. Then, the integrated circuit may establish a predefined phase offset between the portions of the optical signal using at least a phase-offset device in one of the two arms. Furthermore, the integrated circuit may optically couple the portions of the optical signal at optical coupling interfaces at ends of the two arms. Note that the predefined phase offset may reduce the back reflection of the optical signal at the optical splitter to less than a threshold value.

20 Claims, 6 Drawing Sheets

OPTICAL DEVICE WITH REDUCED BACK REFLECTION

BACKGROUND

Field

The present disclosure relates to techniques for back-reflection reduction of optical signals. More specifically, the present disclosure relates to an optical device that reduces back reflection at an optical interface.

RELATED ART

Silicon photonics (SiP) is a promising technology that can provide large communication bandwidth, large density, low latency and low power consumption for inter-chip and intra-chip connections. Notably, SiP uses optical waveguides based on a silicon core and silicon-dioxide cladding to convey optical signals on integrated circuits. In the last few years, significant progress has been made in developing low-cost components for use in inter-chip and intra-chip SiP connections, including: high-bandwidth efficient silicon modulators, low-loss optical waveguides, wavelength-division-multiplexing (WDM) components, and high-speed CMOS optical-waveguide photo-detectors.

However, back reflection of optical signals at optical interfaces (where there is a change in the index of refraction) remains a problem in SiP. Historically, back reflection is challenge that has affected optical systems. For example, lasers are often sensitive to back reflection. Consequently, lasers typically can only tolerate approximately 40 dB of back reflection. In SiP, the high contrast in the index of refraction can induce significantly stronger back reflection (such as approximately 20 dB).

Some optical systems address this problem using an optical isolator between an external laser and one or more SiP components. Recently, other optical systems have proposed less complicated and lower-cost designs that eliminate the optical isolator. Notably, these optical systems rigorously reduce the back reflections in their designs below the back-reflection tolerance of their lasers, and by using lasers that are more tolerant of back reflection. Nonetheless, these approaches involve tradeoffs, which can complicate the design process and adversely impact yield.

SUMMARY

One embodiment of the present disclosure provides an integrated circuit. This integrated circuit includes an optical waveguide defined in a layer in the integrated circuit, where the optical waveguide conveys an optical signal. Moreover, the optical waveguide has at least two arms proximate to optical coupling interfaces at ends of the two arms, and the two arms convey portions of the optical signal. Furthermore, the integrated circuit includes an optical splitter that splits the optical signal into the portions of the optical signal, and a phase-offset device in at least one of the two arms that provides a predefined phase offset between the portions of the optical signal.

In some embodiments, the integrated circuit includes: a substrate, a buried-oxide (BOX) layer disposed on the substrate, and the layer includes a semiconductor layer disposed on the BOX layer. For example, the semiconductor layer may include silicon and/or the substrate may include a semiconductor, such as silicon. Thus, the substrate, the buried-oxide layer and the semiconductor layer may be or may include a silicon-on-insulator technology. Alternatively, the substrate may include an insulator. Note that the layer may include: silicon, silicon dioxide, and/or silicon nitride.

Moreover, a given optical coupling interface may be associated with: a facet, a grating coupler, an echelle grating, and/or an optical discontinuity (such as a change in an index of refraction sufficient to cause at least 40 dB of back reflection).

Furthermore, the phase offset may be approximately 90°. More generally, the phase offset may correspond to a number of the arms.

Additionally, the phase-offset device may include a passive device.

Note that the predefined phase offset may be selected or predefined to reduce back reflection of the portions of the optical signal from the optical interfaces. For example, the back reflection may be reduced below a threshold value, such as 40 dB.

In some embodiments, an amplitude adjustment device is included in at least one of the arms and is used to adjust the amplitude of at least one of the back reflected optical signals in the two arms so the net back reflection is reduced or eliminated.

Another embodiment provides a method for reducing back reflection of an optical signal, which may be performed by the integrated circuit. During operation, the integrated circuit may convey an optical signal in an optical waveguide defined in a layer in the integrated circuit. Then, the integrated circuit may split the optical signal into portions of the optical signal using an optical splitter. Moreover, the integrated circuit may convey the portions of the optical signal in at least two arms of the optical waveguide. Next, the integrated circuit may establish a predefined phase offset between the portions of the optical signal using a phase-offset device in one of the two arms. Furthermore, the integrated circuit may optically couple the portions of the optical signal at optical coupling interfaces at ends of the two arms. Note that a back reflection of the optical signal at the optical splitter may be less than a threshold value, such as 40 dB.

Another embodiment provides a system that includes a first integrated circuit and a second integrated circuit. Either or both of the first integrated circuit and the second integrated circuit may be an instance of the integrated circuit.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An integrated circuit that reduces back reflection of an optical signal is described. This integrated circuit may convey an optical signal in an optical waveguide defined in a layer in the integrated circuit. The integrated circuit may split the optical signal into portions of the optical signal using an optical splitter, and may convey the portions of the optical signal in at least two arms of the optical waveguide. Then, the integrated circuit may establish a predefined phase offset between the portions of the optical signal using at least a phase-offset device in one of the two arms. Furthermore, the integrated circuit may optically couple the portions of the optical signal at optical coupling interfaces at ends of the two arms. Note that the predefined phase offset may reduce back reflection of the optical signal at the optical splitter to less than a threshold value, such as, e.g., 40 dB.

By reducing the back reflection, this optical technique may enable more robust optical devices and systems, and/or design flexibility. Moreover, the reduced back reflection may allow the integrated circuit to be used in a variety of applications and in conjunction with a variety of optical components, including a laser that is sensitive to back reflection, such as a reflective semiconductor optical amplifier (RSOAs) and/or a hybrid external cavity laser. Consequently, the optical technique may enable simpler and lower-cost optical devices and systems, and thus the use of SiP, such as SiP links.

Figure 1:
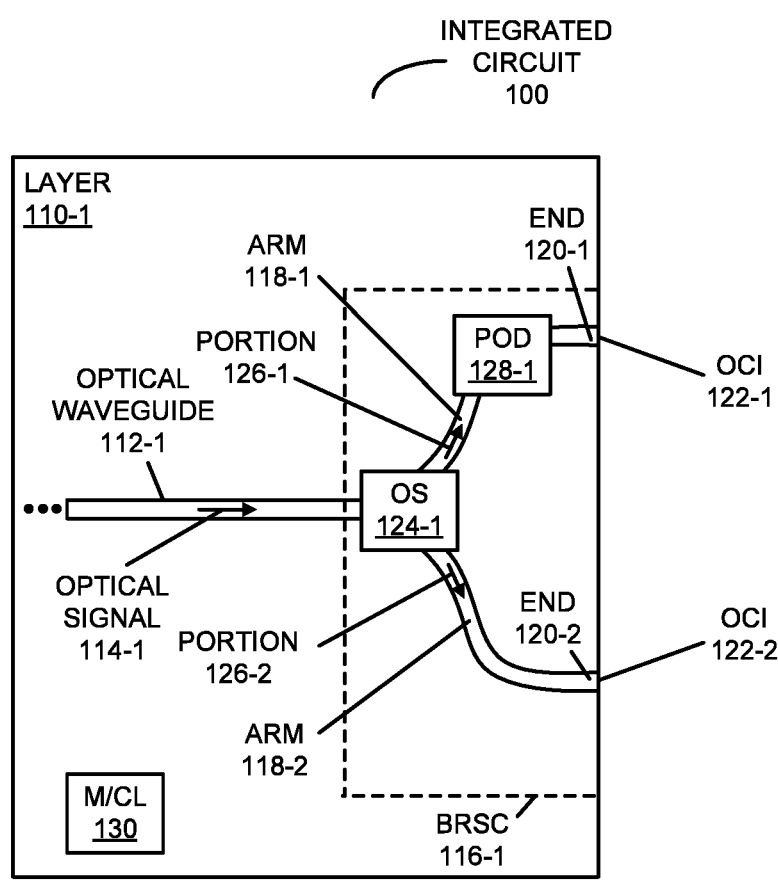
FIG. 1 is a block diagram illustrating a top view of an integrated circuit in accordance with an embodiment of the present disclosure.

We now describe embodiments of the integrated circuit. FIG. 1 presents a block diagram illustrating an example of a top view of an integrated circuit 100 in accordance with some embodiments. This integrated circuit includes an optical waveguide 112-1 that is defined, at least in part, in a layer 110-1 (which is described further below with reference to FIG. 2). During operation of integrated circuit 100, optical waveguide 112-1 may convey an optical signal 114-1, such as from left to right in FIG. 1.

Moreover, integrated circuit 100 may include a back-reflection suppression circuit (BRSC) 116-1. For example, optical waveguide 112-1 may have at least two arms 118 proximate to optical coupling interfaces 122 at ends 120 of the two arms 118, and the two arms 118 may convey, respectively, portions 126 of optical signal 114-1. Furthermore, integrated circuit 100 may include an optical splitter 124-1 that splits optical signal 114-1 into the portions 126 of optical signal 114-1, and a phase-offset device (POD) 128-1 in at least one of the two arms 118 that provides a predefined phase offset between the portions 126 of the optical signal 114-1.

Note that a given one of optical coupling interfaces (OCIs) 122 may include: a facet (such as an untangled facet), a grating coupler, a spot-size converter with blunt terminations, an echelle grating and/or a high index of refraction perturbation or an optical discontinuity (such as the index of refraction difference between layer 110-1 and air, or a change in the index of refraction that is sufficient to cause at least, e.g., 40 dB of back reflection). As described further below with reference to FIGS. 3 and 4, optical coupling interfaces 122 may out-couple portions 126 of the optical signal 114-1 external to integrated circuit 100.

When there are two arms 118, the phase offset may be approximately 90° (such as within a few degrees of 90°). Consequently, back-reflected optical signals in the two arms 118 (which pass through the arms 118 twice) will be out of phase with each other. When these back-reflected optical signals interfere with each other at optical splitter (OS) 124-1, they resulting destructive interference may reduce or suppress the back-reflected optical signal in optical waveguide 112-1. More generally, the phase offset may correspond to a number of the arms and the technique used to implement the arms 118 (such as a multimode interference coupler, a start coupler, a series of 2×2 couplers, etc.). In some embodiments, there may be additional instances of phase-offset device 128-1 in the arms 118. For example, there may be two phase-offset devices (one in each of the arms 118) and the phase offsets in the two arms 118 may be approximately 450 and −45°, respectively.

Thus, the predefined phase offset may be selected or predefined to reduce back reflection of the portions 126 of optical signal 114-1 from the optical interfaces 122. For example, the back reflection may be reduced below a threshold value, such as, e.g., 40 dB.

Phase-offset device 128-1 may include a passive device, such as doped region having a different index of refraction or a region that includes a different material than layer 110-1. Alternatively, phase-offset device 128-1 may be an active device, such as a tuned phase shifter. For example, the phase offset may be thermally tuned, e.g., using a microheater. In some embodiments, a heater (such as nickel chromium) may be implemented by adding doping regions thermally proximate to optical waveguide 112-1, but with a dielectric layer between the heater and optical waveguide 112-1 to prevent optical absorption by metal. Moreover, integrated circuit 110-1 may optionally include one or more monitors (such as monitor/control logic or M/CL 130) in a feedback loop to thermally or otherwise actively tune the back reflection of optical signal 114-1.

In some embodiments, an amplitude adjustment device is included in at least one of the arms 118 and is used to adjust the amplitude(s) of at least one of the back reflected optical signals in the two arms 118 so the net back reflection is reduced or eliminated.

Figure 2:
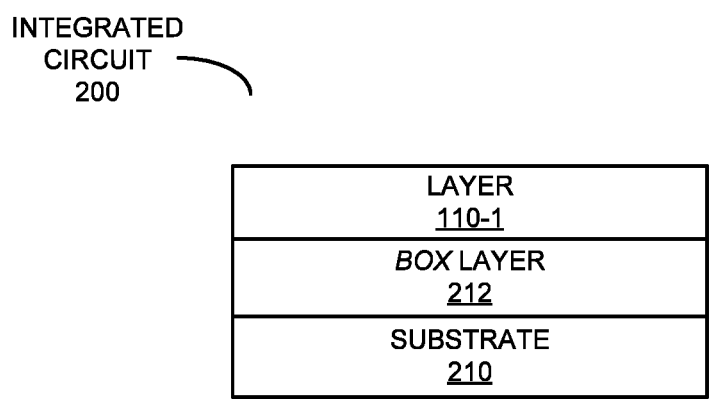
FIG. 2 is a block diagram illustrating a side view of an integrated circuit in accordance with an embodiment of the present disclosure.

Integrated circuit 100 may be implemented using a silicon-on-insulator (SOI) technology or platform. This is shown in FIG. 2, which presents a block diagram illustrating an example of a side view of an integrated circuit 200. This integrated circuit may include a substrate 210 and a buried-oxide (BOX) layer 212 disposed on substrate 210. Moreover, layer 110-1 may include a semiconductor layer disposed on BOX layer 212, where the semiconductor layer, at least in part, includes the optical waveguide 112-1 in FIG. 1. Thus, substrate 210 may include silicon, BOX layer 212 may include silicon dioxide and the semiconductor layer may include silicon.

However, a wide variety of materials may be used to implement integrated circuit 100 and optical waveguide 112-1 in FIG. 1, including: SOI, a semiconductor (e.g., indium phosphide, aluminum gallium arsenide, aluminum gallium nitride arsenide, aluminum gallium arsenide phosphide, a III-V compound semiconductor, etc.), and/or an insulator optical waveguide (e.g., silicon dioxide or silicon nitride). For example, integrated circuit 100 (FIG. 1) may include a substrate that is an insulator. Consequently, layer 110-1 may include: silicon, silicon dioxide, and/or silicon nitride. Therefore, integrated circuit 100 (FIG. 1) may be implemented using a variety of integrated optical waveguide technologies.

In some embodiments, the fundamental or carrier wavelength of optical signal 114-1 in optical waveguide 112-1 in FIG. 1 is, e.g., between 1.1-1.7 μm. For example, optical signal 114-1 may have a fundamental or a carrier wavelength of 1.3 or 1.55 μm. Moreover, layer 110-1 may have a thickness that is, e.g., less than 1 μm (such as 0.2-0.5 μm). Furthermore, layer 110-1 may have a thickness, e.g., of 0.3 μm. Additionally, BOX layer 212 may have a thickness, e.g., between 0.3 and 3 μm (such as 0.8 μm).

Note that optical waveguide 112-1 in FIG. 1 may include a ridge optical waveguide or a channel optical waveguide. Moreover, optical waveguide 112-1 may be a single-mode optical waveguide. For example, optical waveguide 112-1 may have a width of 700 nm.

Figure 3:
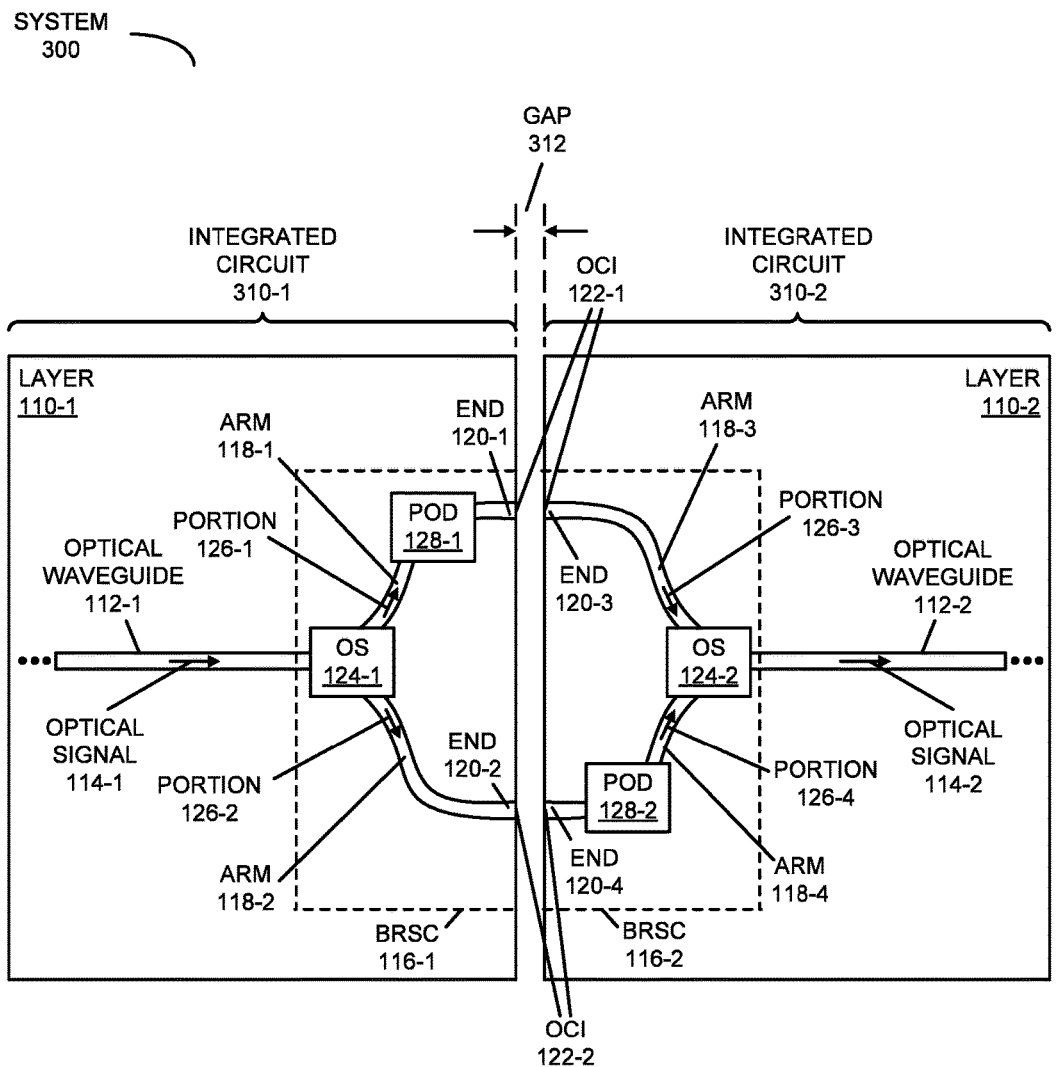
FIG. 3 is a block diagram illustrating a top view of a system that includes two integrated circuits in accordance with an embodiment of the present disclosure.

Two instances of integrated circuit 110-1 or integrated circuits with instances of back-reflection suppression circuit 116-1 may be included in a system that has reduced or suppressed back reflection for either direction of propagation of an optical signal relative to optical interfaces 122 in FIG. 1. This is shown in FIG. 3, which present a block diagram illustrating an example of a top view of a system 300 that includes two integrated circuits 310 with back-reflection suppression circuits 116. The two arms 118 in each of integrated circuits 310 may provide a two-port back-reflection reduction or elimination circuit using phase-based destructive interference from predicted and repeatable reflections at optical interfaces 122. This may allow system 300 to convey optical signal 114-1 across optical interfaces 122 and to output optical signal 114-2. Note that optical interfaces 122 may include an optical coupling gap 312 between integrated circuits 310 of, e.g., at least 200-400 nm.

Figure 4:
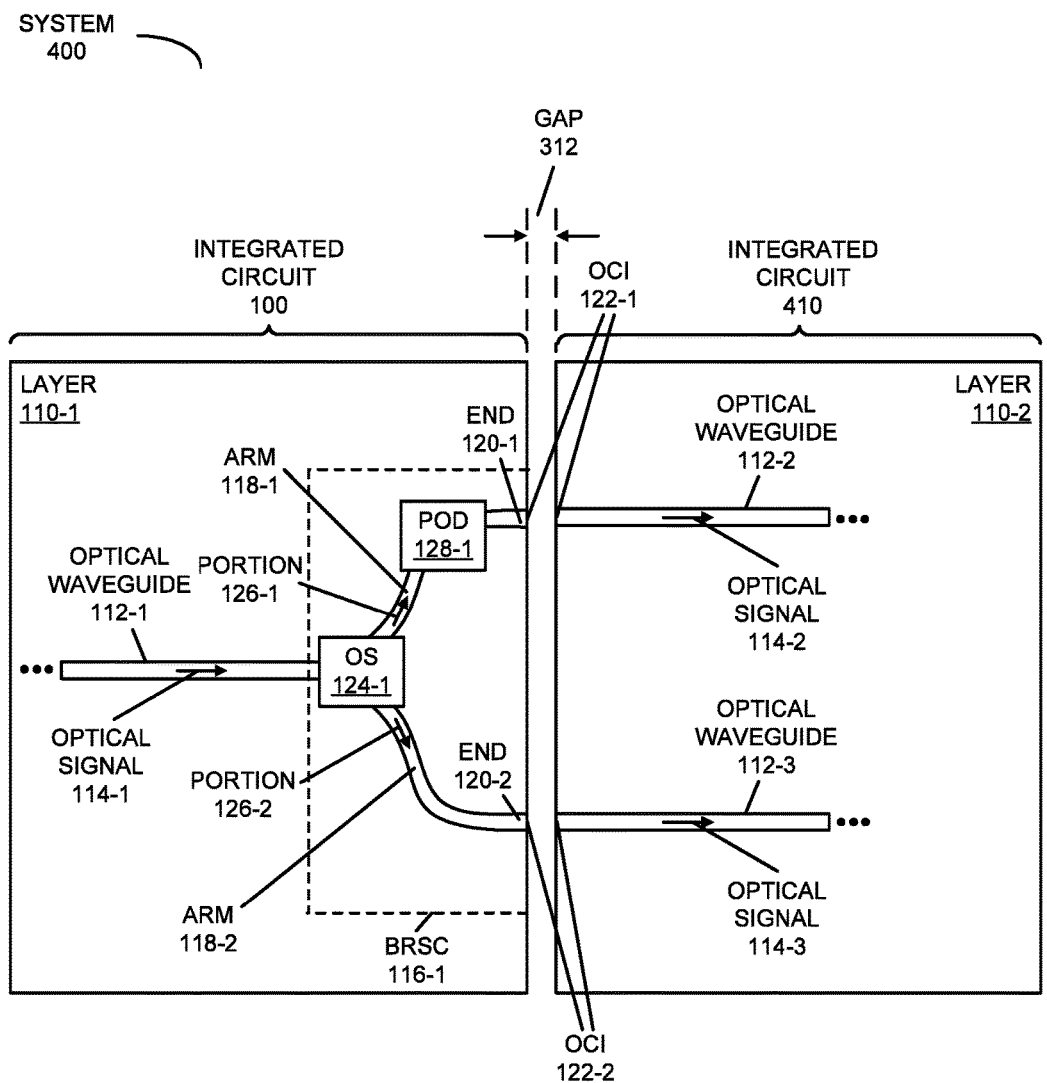
FIG. 4 is a block diagram illustrating a top view of a system that includes two integrated circuits in accordance with an embodiment of the present disclosure.

While FIG. 3 (and FIG. 4 below) illustrates horizontal coupling, in some embodiments there is vertical coupling between integrated circuits 310 (or integrated circuits 100 and 410 in FIG. 4). Moreover, while back-reflection suppression circuits 116 are illustrated as integrated in integrated circuit 100 (FIG. 1) and integrated circuits 310, in other embodiments at least an instance of back-reflection suppression circuit 116-1 is included in a separate component that is optically coupled between, e.g., integrated circuits 310 (or integrated circuits 100 and 410 in FIG. 4), and, more generally, with optical interfaces 122. In the aforementioned embodiments, one or more instances of back-reflection suppression circuit 116-1 enable a single input on optical waveguide 112-1 (FIG. 1) to be conveyed as a single output with reduced or eliminated back reflections.

If a single output is not required or desired, the system may be modified. This is shown in FIG. 4, which presents a block diagram illustrating an example of a top view of a system 400 that includes integrated circuits 100 and 410. In FIG. 4, the multiple outputs (in this example, two optical signals 114) can be included in integrated circuit 410, which may be coupled to a connector, a fiber array, another photonics chip, etc. Note that the 1×2 coupling or ports in FIG. 4 may be expanded to 2N ports (where N is an integer) with an appropriate phase offset(s).

In some embodiments, an integrated circuit (such as integrated circuit 116-1) is used to, at least in part, define an optical cavity in a hybrid external cavity laser. For example, the integrated circuit may be at one end of an optical cavity in a hybrid external cavity laser, and a reflector (such as a mirror, e.g., a total internal reflective mirror) in an RSOA (such as a III/V semiconductor RSOA) may be at the other end.

The optical technique may eliminate the need for an isolator. In embodiments of a hybrid laser, the optical technique may reduce or eliminate back reflections at an optical interface with a III-V semiconductor optical amplifier, which an isolator is not typically able to accomplish of the laser round trip optical path. Therefore, the optical technique may allow an RSOA with a high-reflectivity facet to be used as the gain medium in a 3D integrated hybrid laser.

More generally, the optical technique may impact high-contrast optical platforms. For example, by reducing or eliminating parasitic back reflections, the optical technique may enable 3D integration of components that include optical devices. In the case of grating couplers, parasitic back reflections typically limit the performance of 3D integrated hybrid lasers and external lasers. Consequently, the optical technique may enable simpler and higher performance systems, as well as wafer-scale assembly and manufacturing (and, thus, lower costs). Therefore, the optical technique may enable low-cost optical devices and/or systems, such as photonic links, e.g., in low-cost, high-density optical interconnect applications.

In summary, the optical technique trades the additional complexity of at least a y branch (or, e.g., a 3 dB coupler) to split the optical signal (and, if necessary, to recombine it) to reduce or eliminate back reflection from a predictable optical discontinuity, such as a facet. This concept may be used when there are known circuit elements that have a strong reflection, such as echelle or vertical gratings, or other optical components that include strong index of refraction perturbations. The optical technique may enable a new class of back-reflection tolerant devices and may provide a significant integration and packaging advancement for 3D integrated photonic circuits.

Note that the preceding embodiments may include additional or fewer components. Moreover, positions of one or more components may be changed, two or more components may be combined into a single component and/or a component may be divided into two or more components.

Figure 5:
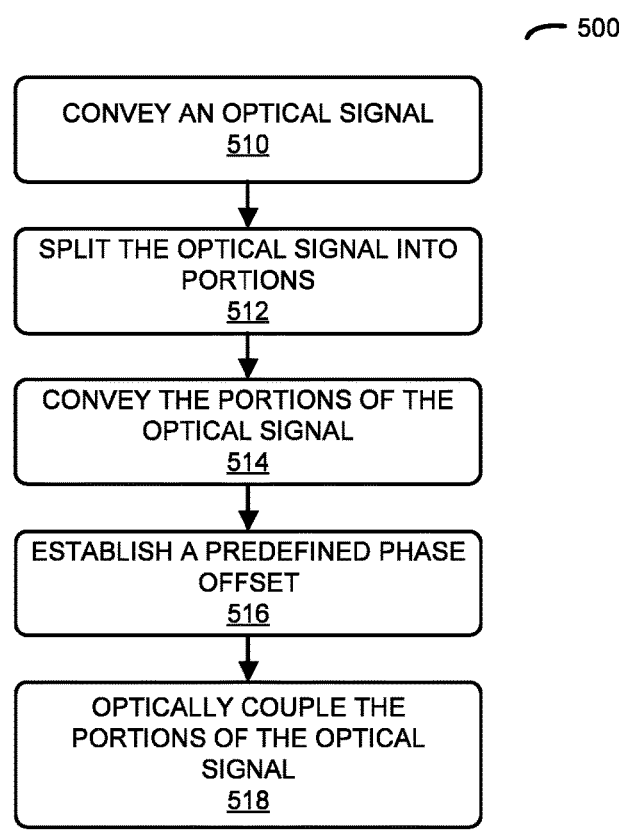
FIG. 5 is a flow chart illustrating a method for reducing back reflection of an optical signal in accordance with an embodiment of the present disclosure.

We now describe embodiments of the method. FIG. 5 presents a flow chart illustrating an example of a method 500 for reducing back reflection of an optical signal in accordance with some embodiments, which may be performed by an embodiment of an integrated circuit, such as one of the integrated circuits in FIGS. 1-4. During operation, the integrated circuit may convey an optical signal (operation 510) in an optical waveguide defined in a layer in the integrated circuit. Then, the integrated circuit may split the optical signal into portions (operation 512) of the optical signal using an optical splitter. Moreover, the integrated circuit may convey the portions of the optical signal (operation 514) in at least two arms of the optical waveguide. Next, the integrated circuit may establish a predefined phase offset (operation 516) between the portions of the optical signal using a phase-offset device in one of the two arms. Furthermore, the integrated circuit may optically couple the portions of the optical signal (operation 518) at optical coupling interfaces at ends of the two arms.

In some embodiments of method 500, there may be additional or fewer operations. Moreover, the order of the operations may be changed, and/or two or more operations may be combined into a single operation.

Figure 6:
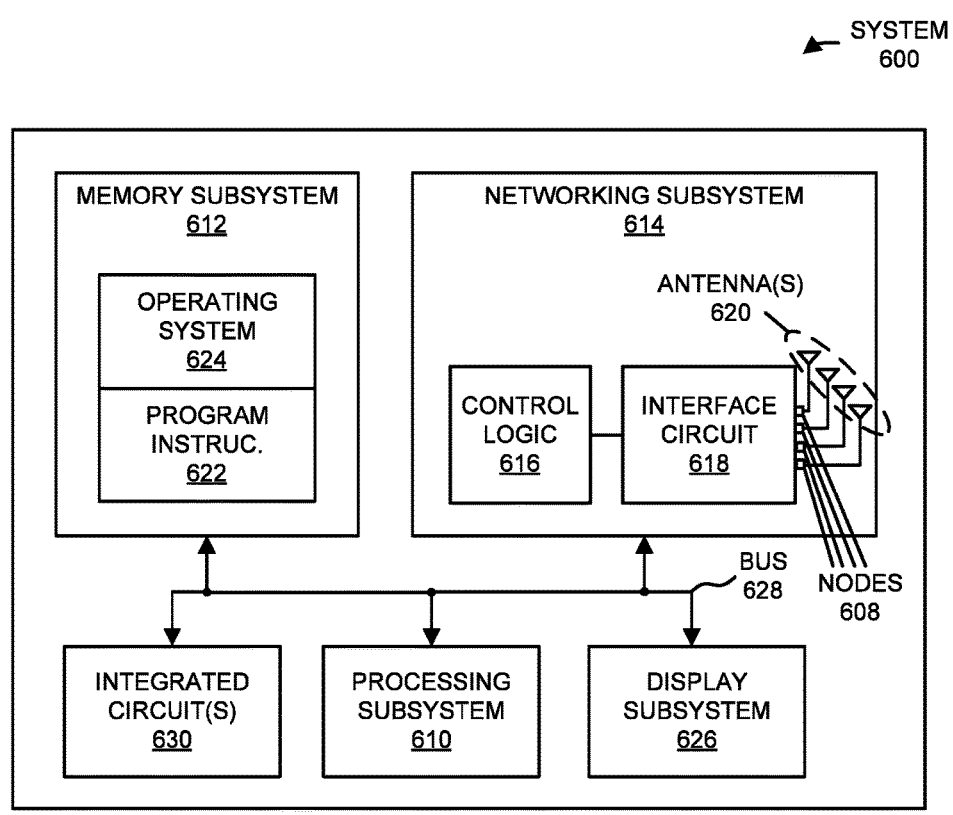
FIG. 6 is a block diagram illustrating a system that includes an integrated circuit in accordance with an embodiment of the present disclosure.

We now describe embodiments of a system, which may perform at least some of the operations in the optical technique. FIG. 6 presents a block diagram illustrating an example of a system 600 (or one or more electronic devices) in accordance with some embodiments. This system includes processing subsystem 610, memory subsystem 612, and networking subsystem 614. Note that one or more of these subsystems may include at least an instance of one of the previous embodiments of the integrated circuit in FIGS. 1-4. Alternatively or additionally, system 600 may optionally include one or more integrated circuits 630 (which may be instances of the integrated circuit) in another component, such as a hybrid external cavity laser.

Processing subsystem 610 includes one or more devices configured to perform computational operations. For example, processing subsystem 610 can include one or more: microprocessors, ASICs, microcontrollers, programmable-logic devices, graphics processing units (GPUs) and/or digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program instructions or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms (such as a circuit or software) for controlling access to the memory. In some embodiments, memory subsystem 612 includes a memory hierarchy that comprises one or more caches coupled to a memory in system 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by system 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more optional antennas 620 (or antenna elements). (While FIG. 6 includes one or more antennas 620, in some embodiments system 600 includes one or more nodes, such as nodes 608, e.g., a pad, which can be coupled to the one or more antennas 620. Thus, system 600 may or may not include the one or more antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, system 600 may use networking subsystem 614 for performing simple wireless communication, e.g., transmitting advertising or beacon frames and/or scanning for advertising frames transmitted by other electronic devices.

Within system 600, processing subsystem 610, memory subsystem 612, networking subsystem 614 and optional integrated circuit(s) 630 are coupled together using signal lines, links or bus 628. These connections may include an electrical, optical, and/or electro-optical connection that the subsystems can use to communicate signals, commands and data among one another.

Furthermore, while some components are shown directly connected to one another in FIG. 6, in general coupling can also occur via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used. Although only one bus 628 (or one or more signal lines) is shown for clarity in FIG. 6, different embodiments can include a different number or configuration of electrical, optical, and/or electro-optical connections among the subsystems.

In some embodiments, system 600 includes a display subsystem 626 for displaying information on a display, which may include a display driver and the display, such as a liquid-crystal display, a multi-touch touchscreen, etc.

System 600 and/or an instance of the integrated circuit may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system and/or an instance of the integrated circuit may include, but is not limited to: a desktop computer, a server (such as a multi-socket, multi-rack server), a laptop computer, a communication device or system, an access point, a router, a switch, communication equipment, a controller, test equipment, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a smartwatch, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, a sensor (such as a LIDAR sensor), an automobile or a truck, another electronic device, a laser (such as a hybrid laser and/or another optical component.

Although specific components are used to describe system 600, in alternative embodiments, different components and/or subsystems may be present in system 600. For example, system 600 may include one or more additional processing subsystems, memory subsystems, networking subsystems, display subsystems and/or one or more additional subsystems not shown in FIG. 6 (such as a user-input subsystem). Additionally, one or more of the subsystems may not be present in system 600. Also, although separate subsystems are shown in FIG. 6, in some embodiments some or all of a given subsystem or component can be moved or integrated into one or more of the other subsystems or component(s) in system 600. For example, in some embodiments program instructions 622 are included in operating system 624 and/or control logic 616 is included in interface circuit 618. Thus, while system 600, as well as the previous embodiments of the integrated circuit, are illustrated as having a number of discrete items, these components are intended to be functional descriptions of the various features that may be present rather than structural schematics of the embodiments described herein.

Moreover, the circuits and components in system 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of system 600. In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures, such as by one or more: ASICs, FPGAs, DPSs, GPUs, etc. Therefore, some or all of the operations in the preceding embodiments may be performed in hardware, in software or both. For example, at least some of the operations in the optical technique may be implemented using program instructions 622, operating system 624 (such as a driver for interface circuit 618) or in firmware in interface circuit 618. Alternatively or additionally, at least some of the operations in the optical technique may be implemented in a physical layer, such as hardware in interface circuit 618. In general, system 600 may be at one location or may be distributed over multiple, geographically dispersed locations.

Moreover, the preceding embodiments of the integrated circuit and/or system 600 can be used in a wide variety of applications, such as: communications (for example, in a transceiver, an optical source (such as a laser), an optical interconnect or an optical link, such as for intra-chip or inter-chip communication), a radio-frequency filter, a biosensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in some of the preceding embodiments, the optical technique may be used with other materials (such as germanium and/or silicon germanium), as is known to one of skill in the art. Moreover, the layer may include polysilicon or amorphous silicon. Furthermore, the materials and compounds in the embodiments of the integrated circuit may be fabricated using a wide variety of processing techniques, including: evaporation, sputtering, chemical vapor deposition, molecular-beam epitaxy, wet or dry etching (such as photolithography or direct-write lithography), polishing, etc. In addition, a wide variety of optical components may be used in or in conjunction with one or more of the embodiments of the integrated circuit. Furthermore, a wide variety of optical sources may be integrated with or included in one or more of the embodiments of the integrated circuit, including many different types of lasers or non-laser optical sources (such as a light-emitting diode).

Moreover, while the preceding discussion included some numerical values, these values are for purposes of illustration and are not intended to be limiting. In other embodiments, different numerical values may be used.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
an optical waveguide defined in a layer in the integrated circuit, wherein the optical waveguide is configured to convey an optical signal, and
wherein the optical waveguide has at least two arms proximate to optical coupling interfaces at ends of the two arms, and the two arms are configured to convey portions of the optical signal prior to the optical coupling interfaces, and wherein the optical coupling interfaces each has a reflectivity greater than a predefined value;
an optical splitter, coupled to the optical waveguide and the two arms, configured to split the optical signal into the portions of the optical signal; and
a phase-offset device in at least one of the two arms configured to provide a predefined phase offset between the portions of the optical signal prior to the optical coupling interfaces, wherein the predefined phase offset is selected or predefined to reduce back reflection of the portions of the optical signal from the optical coupling interfaces.

2. The integrated circuit of claim 1, wherein a given optical coupling interface is associated with one of: a facet, a grating coupler, an echelle grating, or an optical discontinuity.

3. The integrated circuit of claim 1, wherein the predefined phase offset is approximately 90°.

4. The integrated circuit of claim 1, wherein the predefined phase offset corresponds to a number of the arms.

5. The integrated circuit of claim 1, wherein the layer comprises one or more of: silicon, silicon dioxide, or silicon nitride.

6. The integrated circuit of claim 1, further comprising:
a substrate; and
a buried-oxide layer disposed on the substrate, wherein the layer comprises a semiconductor layer disposed on the buried-oxide layer.

7. The integrated circuit of claim 6, wherein the substrate, the buried-oxide layer and the semiconductor layer comprise a silicon-on-insulator technology.

8. The integrated circuit of claim 1, wherein the substrate comprises one of: a semiconductor, or an insulator.

9. The integrated circuit of claim 1, wherein the phase-offset device comprises a passive device.

10. A method for reducing back reflection of an optical signal, comprising:
by an integrated circuit:
conveying an optical signal in an optical waveguide defined in a layer in the integrated circuit;
splitting the optical signal into portions of the optical signal using an optical splitter;
conveying the portions of the optical signal in at least two arms of the optical waveguide;
establishing a predefined phase offset between the portions of the optical signal using a phase-offset device in one of the two arms and prior to optical coupling interfaces; and
optically coupling the portions of the optical signal at the optical coupling interfaces at ends of the two arms, wherein the optical coupling interfaces each has a reflectivity greater than a predefined value, and
wherein the predefined phase offset is selected or predefined to reduce back reflection of the portions of the optical signal from the optical coupling interfaces.

11. A system, comprising:
a first integrated circuit; and
a second integrated circuit, wherein at least one of the first integrated circuit and the second integrated circuit comprises:
an optical waveguide defined in a layer in the integrated circuit, wherein the optical waveguide is configured to convey an optical signal, and
wherein the optical waveguide has at least two arms proximate to optical coupling interfaces at ends of the two arms, and the two arms are configured to convey portions of the optical signal prior to the optical coupling interfaces, and wherein the optical coupling interfaces each has a reflectivity greater than a predefined value;
an optical splitter, coupled to the optical waveguide and the two arms, configured to split the optical signal into the portions of the optical signal; and
a phase-offset device in at least one of the two arms configured to provide a predefined phase offset between the portions of the optical signal prior to the optical coupling interfaces, wherein the predefined phase offset is selected or predefined to reduce back reflection of the portions of the optical signal from the optical coupling interfaces;
wherein the optical coupling interfaces separate the two arms in the first integrated circuit from the two arms in the second integrated circuit; and
wherein the phase-offset devices are in different arms in the first integrated circuit and the second integrated circuit.

12. The system circuit of claim 11, wherein a given optical coupling interface is associated with one of: a facet, a grating coupler, an echelle grating, or an optical discontinuity.

13. The system circuit of claim 11, wherein the predefined phase offset corresponds to a number of the arms.

14. The system circuit of claim 11, wherein the layer the layer comprises one or more of: silicon, silicon dioxide, or silicon nitride.

15. The system circuit of claim 11, further comprising:
a substrate; and
a buried-oxide layer disposed on the substrate, wherein the layer comprises a semiconductor layer disposed on the buried-oxide layer.

16. The system circuit of claim 15, wherein the substrate, the buried-oxide layer and the semiconductor layer comprise a silicon-on-insulator technology.

17. The system circuit of claim 11, wherein the substrate comprises one of: a semiconductor, or an insulator.

18. The system circuit of claim 11, wherein the phase-offset device comprises a passive device.

19. The integrated circuit of claim 1, wherein the optical waveguide is included in a gain medium of an optical source.

20. The system of claim 11, wherein the optical waveguide is included in a gain medium of an optical source.

* * * * *